United States Patent
Sandoghdar et al.

(10) Patent No.: US 12,411,086 B2
(45) Date of Patent: Sep. 9, 2025

(54) OPTOFLUIDIC ANTENNA DEVICE AND METHOD FOR DETECTING AT LEAST ONE PHOTON EMITTED OR SCATTERED BY A SAMPLE

(71) Applicant: Max-Planck-Gesellschaft zur Foerderung der Wissenschaften e. V., Munich (DE)

(72) Inventors: Vahid Sandoghdar, Erlangen (DE); Stephan Goetzinger, Erlangen (DE); Luis Esteban Alejandro Morales Inostroza, Erlangen (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 190 days.

(21) Appl. No.: 18/282,588

(22) PCT Filed: Mar. 30, 2021

(86) PCT No.: PCT/EP2021/058226
§ 371 (c)(1),
(2) Date: Sep. 18, 2023

(87) PCT Pub. No.: WO2022/207073
PCT Pub. Date: Oct. 6, 2022

(65) Prior Publication Data
US 2024/0167953 A1    May 23, 2024

(51) Int. Cl.
*G01N 21/64*    (2006.01)
(52) U.S. Cl.
CPC ... *G01N 21/645* (2013.01); *G01N 2021/6463* (2013.01)

(58) Field of Classification Search
None
See application file for complete search history.

(56) References Cited

U.S. PATENT DOCUMENTS

| | | | |
|---|---|---|---|
| 8,462,334 B2 * | 6/2013 | Lu | B82Y 40/00 356/301 |
| 10,564,091 B2 * | 2/2020 | Gruber | G01N 33/54373 |
| 2011/0170105 A1 * | 7/2011 | Cui | G02B 21/33 356/450 |

OTHER PUBLICATIONS

Bespalova et al. (2019). Single-molecule trapping and measurement in solution. Current Opinion in Chemical Biology, 51, 113-121.
(Continued)

*Primary Examiner* — Marcus H Taningco
(74) *Attorney, Agent, or Firm* — Caesar Rivise, PC (57) ABSTRACT

An optofluidic antenna device (100) for shaping a light field of sample light emitted or scattered by a sample (1) comprises a substrate (10) and a liquid layer (20) being supported by the substrate (10) and being arranged for accommodating the sample (1) to be investigated between a first liquid surface (21) facing the substrate (10) and a second liquid surface (22) opposite to the first liquid surface (21), wherein a thickness of the liquid layer (20) between the first and second liquid surfaces (21, 22) and refractive indices of the substrate (10) and the liquid layer (20) are selected such that an optofluidic antenna is formed, which is capable of directing the sample light mainly towards the substrate (10), and a gas volume (30) is arranged above the liquid layer (20), so that the second liquid surface (22) is formed as a liquid-gas-interface. Furthermore, a measuring apparatus (300), that comprises the optofluidic antenna device (100), and a method of detecting at least one photon emitted or scat-tered from a sample (1), in particular a single analyte in a liquid, are described.

30 Claims, 7 Drawing Sheets

(56) References Cited

OTHER PUBLICATIONS

Chen et al. (2011). 99% efficiency in collecting photons from a single emitter. Optics Letters, 36(18), 3545-3547.
Chu et al. (2014). Experimental realization of an optical antenna designed for collecting 99% of photons from a quantum emitter. Optica, 1(4), 203-208.
Chu. (2018). Thesis "Collecting photons with near-unity efficiency using a dielectric antenna". Friedrich-Alexander University Erlangen-Nuernberg.
Croop et al. (2019). Recent advancement of light-based single-molecule approaches for studying biomolecules. WIREs Syst Biol Med.; 11:e1445.
Lee et al. (2011). A planar dielectric antenna for directional single-photon emission and near-unity collection efficiency. Nature Photonics, 5, 166-169.
Sandoghar et al. (2023). An optofluidic antenna for enhancing the sensitivity of single-emitter measurements. DOI: https://doi.org/10.21203/rs.3.rs-2497202/v1.
Squires et al. (2019). Interferometric scattering enables fluorescence-free electrokinetic trapping of single nanoparticles in free solution. NANO Letters, 19, 4112-4117.
Yuan et al. (2013). Thousand-fold enhancement of single-molecule fluorescence near a single gold nanorod**. Angew. Chem. Int. Ed., 52, 1217-1221.
International Search Report for PCT/EP2021/058226 dated Dec. 9, 2021.

\* cited by examiner

OPTOFLUIDIC ANTENNA DEVICE AND METHOD FOR DETECTING AT LEAST ONE PHOTON EMITTED OR SCATTERED BY A SAMPLE

CROSS-REFERENCE TO RELATED APPLICATIONS

This application is a U.S. National Phase Application of PCT/EP2021/058226, filed Mar. 30, 2021, the contents of which are incorporated herein by reference in their entireties for all purposes.

FIELD OF THE INVENTION

The invention relates to an optofluidic antenna device, a measuring apparatus including the optofluidic antenna device and a method for detecting at least one photon emitted or scattered by a sample, e. g. a single analyte or multiple analytes, in a liquid. Applications of the invention are available in the fields of physical, chemical and/or biological sample investigations, like e. g. protein folding studies and fluorescence resonance energy transfer (FRET) measurements.

BACKGROUND OF THE INVENTION

In the present specification, reference is made to the following prior art illustrating the technical background of the invention, in particular relating to optical detection of analytes in liquids or solids:

[1] H. Yuan et al. in "Angewandte Chemie International Edition" 52, 1217-1221 (2013);
[2] M. I. Bespalova et al. in "Current Opinion in Chemical Biology" 51, 113-121 (2019);
[3] A. Squires et al. in "Nano Letters" 19, 4112-4117 (2019);
[4] B. Croop et al. in "Systems Biology and Medicine" 11, 4 (2019);
[5] W. W. Chen et al. in "Optics Letters" 36, 3545-3547 (2011); and
[6] K. G. Lee et al. in "Nature Photonics" 5, 166-169 (2011).

Optical detection of single analytes in liquids has been a major tool in the last decades in biology, biophysics, analytical chemistry and medicine. The great interest in these fields arises from the potential of understanding the underlying rotational and translational dynamics of single analytes in liquids. However, when measuring at the single analyte level, the short observation time caused by free diffusion typically leads to a poor signal to noise ratio (SNR). Otherwise, if multiple analytes are detected, the statistical average over several molecules erases the rich dynamic in-formation of the individual components. In this context, techniques based on single molecule fluorescence correlation spectroscopy (smFCS) have been extensively used due to their high temporal and spatial resolution. However, the obtainable temporal resolution when using standard optical microscopes is often limited by the number of photons that can be detected in a given time interval, but also by the effective observation volume.

This problem has been addressed before and various techniques have been suggested trying to overcome this shortcoming. One of them is the use of plasmonic nano-antennas [1]. Here, the strategy is to enhance the photon emission rate via the Purcell effect (enhancement of the spontaneous emission rate of an emitter due to a modification of the density of states) rather than increasing the collection efficiency. Plasmonic nano-antennas also offer a sub-diffraction limited observation volume which is very attractive when measuring a high concentration of the analyte in the micro to millimolar regime.

Another strategy to increase the total number of collected photons is to increase the observation time per single analyte. This effective observation time can vary from microseconds to minutes depending on the nature of the analyte. Various techniques have been demonstrated for confining and trapping single analytes in solution including nano channels, ABEL traps and thermophoretic trapping [2]. A promising tool for long-time observation of analytes in solution arises from the combination of iSCAT and ABEL traps [3]. Here, the interference between the scattered signal from individual analytes and a reference signal is detected while the analyte is confined by an ABEL trap. However, this technique requires a sample with 10 000 atoms or more, while a single fluorescent molecule which diffuses on a liquid would be too small. An alternative known approach is to slow down the diffusion of the analytes effectively via immobilization, encapsulation or tethering to larger structures [4].

A planar dielectric structure has been proposed for detecting single-photon emissions, wherein a layered structure is employed to tailor an angular emission of a single oriented source molecule and to allow collection with a conventional microscope objective [5, 6]. Due to this directional photon emission, the layered structure is described as a so called dielectric antenna with an emission characteristic directed towards the microscope objective.

With the dielectric antenna, a single source molecule is embedded in a dielectric layer that is sandwiched between two layers with a larger refractive index on one side and a smaller refractive index on the other side. This arrangement has an effect such that a high photon emission rate is directed into the high-index medium ("suction effect" towards the high-index medium). A collection efficiency of 96% has been demonstrated for single source molecule embedded in a polymer polyvinyl alcohol (PVA) layer, forming a quasi-waveguide, arranged on top of a sapphire cover glass as the high-index medium and air as the top layer.

Dielectric antennas have a potential of investigating single analyte molecules. However, the fixed position and orientation of the single source molecule is an integral part to the conventional planar dielectric antenna technique, so that applications thereof are restricted to solid samples. In contrast to this, there is an interest in investigating analytes in a liquid, where a molecule has neither a fixed position nor a given orientation.

In summary, conventional optical detection techniques for detecting single analytes in liquids have substantial disadvantages in terms of comparably low photon detection efficiencies and in-capability for long-term observation studies. Antenna based techniques overcoming these disadvantages typically have been used for sensing emissions from single emitters fixed in solids only.

Objective of the Invention

The objective of the invention is to provide improved devices and methods allowing a detection of at least one photon emitted or scattered of a sample in a liquid, avoiding disadvantages of conventional techniques. In particular, photon detection is to be provided with increased photon collection efficiency and/or easy implementation of the measuring setup.

SUMMARY OF THE INVENTION

The above objective is solved by an optofluidic antenna device of the invention, a measuring apparatus including the optofluidic antenna device of the invention and/or a method of the invention for detecting at least one photon emitted or scattered of a sample.

According to a first general aspect of the invention, the above objective is solved by an optofluidic antenna device, being adapted for shaping a light field (also indicated as radiation pattern) of sample light emitted or scattered by a sample to be investigated. The optofluidic antenna device comprises a substrate and a liquid layer being supported by the substrate and being arranged for accommodating the sample to be investigated between a first liquid surface facing to the substrate and a second liquid surface opposite to the first liquid surface. A thickness of the liquid layer between the first and second liquid surfaces and refractive indices of the substrate and the liquid layer are selected such that an optofluidic antenna (also indicated as directional antenna or liquid layer based antenna) is formed, which is capable of directing the sample light mainly towards the substrate. Furthermore, according to the invention, a gas volume is arranged above the liquid layer, so that the second liquid surface is formed as a liquid-gas-interface.

According to a second general aspect of the invention, the above objective is solved by a measuring apparatus, being adapted for detecting at least one photon emitted or scattered by a sample, comprising the optofluidic antenna device according to the first general aspect of the invention or an embodiment thereof, an excitation light source device being arranged for irradiating the sample in the liquid layer with excitation light and creating the at least one photon, and a detector device, preferably comprising a lens device and a sensor device, wherein the detector device is arranged for detecting the at least one photon created in the liquid layer.

Optionally, the excitation light source device is adapted for one of a confocal, wide-field, total internal reflection and structured illumination excitation for irradiating the sample in the liquid layer. Different illumination excitation types may be applied so that photons emitted by the excitation light source device either can be scattered by the sample or excite the sample to emit photons. Advantageously, the invention is not limited to a specific illumination excitation scheme, but fully compatible with different schemes, resulting in a variety of implementation options.

According to a third general aspect of the invention, the above objective is solved by a method of detecting at least one photon emitted or scattered from a sample, in particular a single analyte or multiple analytes, in a liquid, wherein the optofluidic antenna device according to the first general aspect of the invention or an embodiment thereof is used, comprising the steps of accommodating the liquid layer including the sample above the substrate of the optofluidic antenna device, irradiating the sample in the liquid layer with excitation light from an excitation light source device and creating the at least one photon, and detecting the at least one photon created in the liquid layer with a detector device. Preferably, the inventive method for detecting at least one photon or embodiments thereof are carried out with the measuring apparatus of the second general aspect of the invention or embodiments thereof.

The term "optofluidic antenna" refers to a stack of materials, including the gas volume, the liquid layer and the substrate. In other words, the optofluidic antenna is characterized in that an antenna volume (or: detection volume) is formed in the liquid layer between two layers, including the substrate which has a higher refractive index than the liquid layer, and the gas of the gas volume, which has a lower refractive index than the liquid sample layer. Similarly to the conventional "planar dielectric antenna", this stacked configuration results in a predominant photon emission rate from the sample towards the layer with the largest refractive index, i.e. the substrate. However, instead of embedding the sample in a solid layer, as taught in [5, 6], the optofluidic antenna comprises the sample and the antenna volume of the liquid sample layer limited by the liquid air interface and the substrate, wherein the sample is confined in the liquid layer.

The term "liquid-gas-interface" refers to the interface between the liquid and the gas volume. Preferably, the liquid and the gas directly contact each other at the interface. Alternatively, the liquid and the gas are separated by a separating layer at the interface, wherein the separating layer has no or negligible influence on shaping the light field in the optofluidic antenna device.

The separating layer has no or negligible influence on the refractive index distribution in the optofluidic antenna. As an example, the separating layer comprises a layer of graphene. In other words, the liquid-gas-interface may be provided by the surface of the liquid being exposed to the gas or by the separating layer being exposed to the gas on one side and being in contact with the liquid on the other side.

The term "antenna volume" generally refers to a spatial region of the liquid layer having a reduced refractive index on the gas side and an increasing refractive index on the substrate side, thus forming the emission characteristic towards the substrate. With the main application of the optofluidic antenna device for detecting photons, the antenna volume is a spatial region of the liquid layer which is irradiated with the excitation light source device and from which sample light is collected with the detector device. The sample may be trapped in the antenna volume (i. e. the sample can be found in the antenna volume with high probability). Advantageously, the inventors have found that it is sufficient for the photon detection that the sample is not fixed in specific position or orientation, but may move within the liquid layer, including e. g. traveling of one single analyte within the antenna volume or successive movement of multiple single analytes though the antenna volume.

The inventors have found that the emission directing effect of the solid dielectric antenna structure, e. g. according to [5, 6], can be utilized for sensing photons from samples diffusing in a liquid. It has been demonstrated that fixed embedding a sample in a solid layer is not strictly necessary, but that indeed the antenna concept also can be applied in liquids. Advantageously, with the gas volume above the liquid layer and providing the second liquid surface as a liquid-gas-interface, setting the refractive index gradient towards the substrate and selecting the thickness of the liquid layer is facilitated. Furthermore, with setting the photonic antenna function by selecting the liquid layer thickness, simultaneously fluidic properties are obtained such that free diffusion of the sample in the liquid is restricted. The emission characteristic of the optofluidic antenna device towards a photon collection site, e. g. towards a light guiding structure and/or directly to a detector device, is obtained by directing the emitted or scattered light from the sample towards the material with the highest refractive index, thus allowing a significantly enhanced photon collection efficiency in comparison to known methods for detecting photons of analytes in liquids.

Advantageously, the inventors have found that the sample moves slower than determined by free Brownian motion. A contact-free effective confinement of the Brownian motion of the sample can be imposed by boundary conditions of the liquid layer, in particular the first and second liquid surfaces thereof. Possibly, due to these geometrical boundaries and in particular by the effect of an electrical potential (interface charging) inherently formed between the liquid-gas-interface and the sample, the sample is slowed down. Thus, improving the collection efficiency of photons and further allowing an increased total observation time as well as an increased total number of detected photons are obtained. Furthermore, it has been found that an exact dipole orientation of the sample in the fluid is not critical as the dipole orientation averages due to the high rotation speed of the sample molecule(s).

As a further advantage, the measurements by the inventors have shown that more than 84% of the photons from a single analyte can be collected with the inventive measuring apparatus. This is a 2.5-fold enhancement in the collection efficiency compared to a conventional high-end microscopy immersion objective. The high enhancement in the collection efficiency has been demonstrated e. g. by recording fluorescence burst signals of analytes measured under different experimental conditions, as will be discussed below. In addition, up to a 100-fold increase of the effective observation time per single analyte can be achieved due to the geometrical restrictions imposed by the adjusting the liquid-gas-interface.

Further advantages have been found in that the invention is insensitive to the emission or scattered wavelength of the sample. The invention is also easy to realize and very robust against misalignments in a measuring setup. In particular, the invention can be readily implemented using commercially available sample processing apparatuses, like flow cytometry devices or optical microscopes, and can be realized easily and inexpensively with standard chemistry laboratory supplies. In particular, the invention is fully compatible with other known methods for decreasing the observation volume and for enhancing the emission rate per analyte such as plasmonic nano-antennas. Additionally, the invention can be combined with at least one of slowing down the diffusion, trapping, tethering, encapsulation and immobilization to further enhance the observation time per analyte. The invention can also be combined with known data processing and/or analysis concepts.

Advantageously, the invention can be carried out with various types of samples to be investigated. The sample can be provided in the liquid in a dissolved or in a suspended condition. Preferably, the sample is a single analyte (or: single molecule). Accordingly, conditions of the liquid layer including the sample, e. g. the sample concentration, are controlled such that the single analyte is included in an antenna volume of the liquid layer. Advantageously, this allows detecting photon emission or scattering processes with high selectivity. Alternatively, the sample may comprise multiple analytes (or: multiple molecules). Detecting photons from multiple analytes may have advantages in terms of increased obtainable signal strength. The multiple analytes can be arranged in the antenna volume separately from each other or as at least one aggregate (or: particle). Furthermore, all multiple analytes may comprise the same molecule type, or the multiple analytes may comprise at least two different molecules, in particular emitting with two different wavelengths. With the latter case, the inventive optofluidic antenna device can be employed e. g. for investigating fluorescence resonance energy transfer (FRET) in a sample.

The at least one photon may be emitted by the sample after being excited with excitation light, e. g. by fluorescence emission, or the at least one photon may be a photon created by a scattering process, e. g. due to the Raman or Rayleigh scattering.

Preferably, the sample comprises a biological sample, in particular at least one biological molecule, i. e. an analyte obtained from a biological cell and/or another component of a biological organism, like a protein or another macromolecule, like DNA or RNA. Preferably, the liquid layer comprises at least one of water, a buffer solution and a cultivation liquid.

Accommodating the liquid layer above the substrate may comprise arranging the liquid layer directly on top of (i.e. in contact with) the substrate. Alternatively, the liquid layer can be accommodated above the substrate in that one or more intermediate layers are arranged between the substrate and the liquid layer. Thus, according to a preferred embodiment of the invention, a spacer layer can be arranged on the substrate for accommodating the liquid layer, wherein the substrate and the spacer layer form a stack of refractive layers arranged in order of descending or constant refractive indices with the substrate having the highest refractive index. In terms of the method of detecting at least one photon, directing the at least one photon through the substrate layer towards the detector device can be enhanced by the spacer layer between the substrate and the liquid layer.

Advantageously, the spacer layer defines a minimum distance between the antenna volume, in particular the sample in the antenna volume, and the substrate whereby, inter alia, the number of photons emitted or scattered in parallel to the first substrate layer is decreased. Hence, directing the at least one photon through the substrate layer towards a detector device is enhanced by the spacer layer.

Preferably, the spacer layer and the liquid layer have the same refractive index which is smaller than the refractive index of the substrate. Alternatively, the spacer layer and the substrate have the same refractive index which is higher than the refractive index of the liquid layer. Advantageously, the path of the emitted or scattered photons is not impaired by the spacer layer. In particular, in the case of perfectly matched refractive index, the spacer layer is invisible the photons and only one boundary between two layers with different refractive indices remains like in the case without the spacer layer.

According to further advantageous embodiments of the invention, a layer thickness of the spacer layer preferably is about $\lambda/2$, with $\lambda$ being the wavelength of the excitation light, e. g. in a range between 200 nm to 400 nm.

According to a further advantageous embodiment of the invention, the substrate has a refractive index of at least 1.35. Thus, formation of the optofluidic antenna device is facilitated. Preferably, the substrate layer is at least partially made of sapphire and/or glass. The materials have advantages in terms of a high refractive index. A layer thickness of the substrate layer may be selected in a range e. g. between 150 µm and 200 µm. However, depending on imaging properties of an objective of the detector device for detecting the at least one photon created in the liquid layer, the substrate layer may be thicker or thinner. Particularly preferred, the substrate layer is a microscopy cover glass. Thus, advantages in terms of low costs of the inventive setup can be obtained. Additionally or alternatively, the spacer layer includes at least one of magnesium fluoride, silicon dioxide and a fluoropolymer. These materials have advantages in terms of well-known optical properties and a high refractive index.

Preferably, the liquid layer comprises an aqueous liquid, in particular water or an aqueous buffer solution. These preferred examples have particular advantages in terms of the refractive index and applications in investigations of biological samples.

With a preferred example, three layers form a stack of refractive layers with increasing or constant refractive indices towards the substrate, including a water layer (refractive index of 1.33), a spacer layer of fluoropolymer such as "CYTOP" (refractive index of 1.37) and a microscopy cover glass (refractive index of around 1.5). Additionally, it is further favorable that available standard materials and equipment can be used to form the three layers.

According to another advantageous embodiment of the invention, the substrate has an exposed substrate surface being arranged opposite to the liquid layer, wherein the sample light is detectable through the exposed substrate surface by a detector device. The term "exposed substrate surface" refers to a surface through which light can be coupled from the substrate to the adjacent space, comprising e. g. directly the detector device, a waveguide coupling the substrate with the detector device, a lens device and/or free space between the substrate and the detector device. Advantageously, with the exposed substrate surface, a compact design of the optofluidic antenna device or the measuring apparatus can be obtained.

If according to another variant of the invention, a reflector element is arranged in the gas volume with a distance from the liquid-gas-interface for further enhancing the radiation to the substrate, the light collection efficiency of the optofluidic antenna device is further improved. In terms of the method of detecting at least one photon, the radiation through the substrate is further enhanced with the reflector element. The reflector element comprises a reflecting material, preferably a metal, like a reflective coating and/or a reflective body, or a distributed Bragg reflector (DBR), and it is fixed to a structure containing the gas volume. The reflector element has an extension, which may cover the whole antenna volume or a part thereof. With a further option, a semi-transmissive reflector element can be provided, that allows an excitation of the sample by irradiation through the reflector element.

As a further advantage of the invention, multiple options for locating and adjusting the gas volume adjacent to the liquid layer are available. According to a preferred embodiment, the gas volume is formed in a gas-filled compartment having an open side facing to the substrate and being submerged into the liquid layer is provided, wherein the gas-filled compartment is arranged with a distance from the first liquid surface, and the liquid-gas-interface is formed in the gas-filled compartment. According to an alternative embodiment the gas volume is formed by a gas bubble being positioned with a gas bubble holding device in the liquid layer, as outlined below.

The term "gas-filled compartment" refers to a solid hollow structure accommodating the gas volume and being open towards the liquid layer. The gas volume is held between compartment walls of the gas-filled compartment by the buoyancy of the gas, i. e. the gas-filled compartment is arranged vertically above the liquid layer. Providing the gas volume with the gas-filled compartment has multiple advantages. Firstly, the gas volume can be positioned with high precision and reproducibility. Furthermore, the gas-filled compartment facilitates setting the thickness of the liquid layer and/or the position of the liquid-gas-interface.

Preferably, the substrate includes at least one trench, in particular pockets, being aligned with the gas-filled compartment. The at least one trench has a shape selected in dependency on the particular application conditions and may comprise e. g. a circular or rectangular shape. Advantageously, the at least one trench further enhances the trapping effect caused by the liquid-gas-interface.

Alternatively or additionally, an inner compartment surface of the gas-filled compartment comprises a hydrophobic coating. The hydrophobic coating is made of e. g. dichlorodimethylsilane or another hydrophobic substance. Advantageously, the hydrophobic coating can substantially decrease or event prevent a capillary effect within the gas-filled compartment. Wetting the inner compartment wall of the gas-filled compartment with the liquid sample layer is suppressed. Furthermore, a meniscus shape of the liquid-gas-interface can be influenced and the geometry of the optofluidic antenna can be tuned.

According to a further preferred variant, a compartment setting device, in particular including an actuator, like a piezo-actuator, can be provided which is adapted for setting a distance between the gas-filled compartment and the substrate. The compartment setting device facilitates the adjustment of the liquid-gas-interface and in particular the thickness of the liquid layer and thus the geometry of the optofluidic antenna.

In particular, the inventors have found that the orientation and distance of a gas-filled tube with respect to the substrate as well as the depth of the antenna volume, i.e. thickness of the liquid within the tube, in particular the distance between the substrate layer or the optional spacer layer and the liquid-gas-interface inside the tube, have an effect on the photon collection efficiency. Accordingly, with the compartment setting device, the gas-filled tube can be adjustably arranged. The arrangement of the tube with respect to the substrate and the distance between the liquid-gas-interface and the substrate (or the spacer layer) can be adjusted for each measurement, if necessary, to find an arrangement resulting in the highest possible photon detection efficiency.

Preferably, the gas-filled compartment encloses a gas bubble providing the gas volume. Advantageously, the configuration of the optofluidic antenna device can be simplified with this embodiment. Alternatively, the gas volume in the gas-filled compartment is connected with a gas reservoir, e. g. via a supply line. In this case, advantages in terms of adjusting the gas volume can be obtained.

According to a further advantageous embodiment of the invention, the gas-filled compartment is connected with a pressure setting device being arranged for setting a gas pressure in the gas-filled compartment, and the thickness of the liquid layer can be adjusted by operating the pressure setting device. The pressure setting device provides an additional degree of freedom for adjusting the optofluidic antenna device. Preferably, the pressure setting device comprises at least one of a syringe, a pump, a gas reservoir with adjustable pressure, a compartment temperature control device and an electrolytic gas source. In particular, the syringe has advantages in terms of simple controllability, optionally with a manual or a motorized control, and low costs.

If, according to a further variant of the invention, the gas-filled compartment is provided by a tube, in particular a capillary tube or a larger tube or hose, or a cantilever tip, positioning the gas volume relative to the liquid layer and the substrate by manipulating the capillary tube or the cantilever tip is facilitated. Preferably, the tube is a capillary tube, in particular with an inner diameter below 100 μm, e. g. below 50 μm and/or above 3 μm. Advantageously, with these limits, the inner diameter is small enough for sufficiently restricting the sample diffusion and large enough for facilitating precise adjusting of the optofluidic antenna. Depending on the application conditions, a larger tube diameter can be provided. For setting a defined distance relative to the substrate or the spacer layer, an end of the tube facing to the substrate preferably is cleaved to have a flat end.

The capillary tube has the additional advantage of providing a gas supply line, so that the pressure and/or size of the gas volume can be optimized. In particular, an embodiment including the capillary tube and the pressure setting device advantageously provides an effective measure with low complexity, which prevents the sample from freely diffusing in the liquid. The cantilever tip is preferred for holding a gas bubble.

For providing the antenna volume, the tube end of the tube is adapted for a submerged arrangement in the liquid layer. In other words, the tube is configured such that the tube end thereof preferably can be set with a distance from a surface of the substrate (or any intermediate layer thereon) that is below a thickness of a liquid layer spread on the surface. As an example, a thickness between the tube end and the surface is equal to or below half of the tube's inner diameter, for instance equal to or below 2 μm. With the latter limit advantages for slowing down the sample in the liquid layer by influencing the diffusion can be obtained. During the measurement, the distance can be reduced down to zero, or the first tube end even can be accommodated by trenches in the substrate surface.

According to another embodiment of the invention, the optofluidic antenna device is a portion of a fluidic microsystem including the substrate and a cover plate providing a space therebetween, the liquid layer is accommodated between the substrate and the cover plate, and the gas-filled compartment is formed as a recess in at least one of the substrate and the cover plate. Integrating the optofluidic antenna device has particular advantages for combing the use of the optofluidic antenna device with other sample handling techniques executed in a fluidic microsystem, like e. g. analyte processing, sorting, or labelling.

The fluidic microsystem is a solid body including at least one channel with characteristic cross-sectional dimensions below 1 mm. The body of the fluidic microsystem comprises a monolithic structure or a multi-layer structure, wherein a bottom portion provides the substrate and an upper portion provides the cover plate. The recess in the cover plate is filled with the gas volume, e. g. as a gas bubble or by connecting the recess via a supply line with a gas reservoir.

Optionally, the recess is provided in the cover plate with a step-shaped cross-section, including a step plane facing to the substrate, and a reflector element is arranged on the step plane. The step plane is preferably parallel to the extension of the liquid layer and the substrate. As outlined above, the reflector element in the gas volume with a distance from the liquid-gas-interface is capable of further enhancing the radiation from the sample to the substrate.

As an alternative to the provision of the gas-filled compartment, the optofluidic antenna device can be configured such that the gas volume is formed by a gas bubble being positioned with a gas bubble holding device in a liquid volume including the liquid layer. Advantageously, with the use of the gas bubble holding device, particular measures for shaping the liquid layer can be omitted as the liquid layer is the section of the liquid volume between the gas bubble positioned with the gas bubble holding device and the substrate. The gas bubble holding device is adapted for holding the gas volume by a mechanical force or an optical force. Preferred examples of the gas bubble holding device comprise at least one of a mechanical support rod, an optical tweezer and an acoustic tweezer.

As yet another alternative to the provision of the gas-filled compartment or the gas bubble holding device, the optofluidic antenna device can be configured such that the substrate has a recess accommodating the liquid layer, wherein a depth of the recess determines the thickness of the liquid layer, and the gas volume is formed by a free space above the liquid layer. This embodiment has advantages in terms of the simple structure of the optofluidic antenna device. It is preferred e. g. with applications of the optofluidic antenna device without a need for adjusting the thickness of the liquid layer.

The optofluidic antenna device can be configured with one single optofluidic antenna device. Alternatively, according to a preferred embodiment of the invention, multiple gas volumes are arranged above the liquid layer, and multiple optofluidic antennas are formed by the gas volumes, the liquid layer and the substrate. Advantageously, this embodiment allows multiple optofluidic antenna device applications, e. g. for measuring purposes, in parallel, thus increasing a through-put of a sample analysis.

Features disclosed in the context of the optofluidic antenna device and/or the measuring apparatus and the embodiments thereof also represent preferred features of the inventive method of detecting at least one photon and vice versa. The aforementioned aspects and inventive and preferred features, in particular with regard to the configuration of the optofluidic antenna device and/or measuring apparatus as well as the dimensions and compositions of individual components which have been described in relation to the optofluidic antenna device and/or the measuring apparatus, therefore also apply for the method. The preferred embodiments, variants and features of the invention described above are combinable with one another as desired.

BRIEF DESCRIPTION OF THE DRAWINGS

Further details and advantages of the invention are described with reference to the attached drawings, which show in FIGS. 1 to 11: cross-sectional illustrations of different embodiments of optofluidic antenna devices.

DESCRIPTION OF PREFERRED EMBODIMENTS

Figure 11:
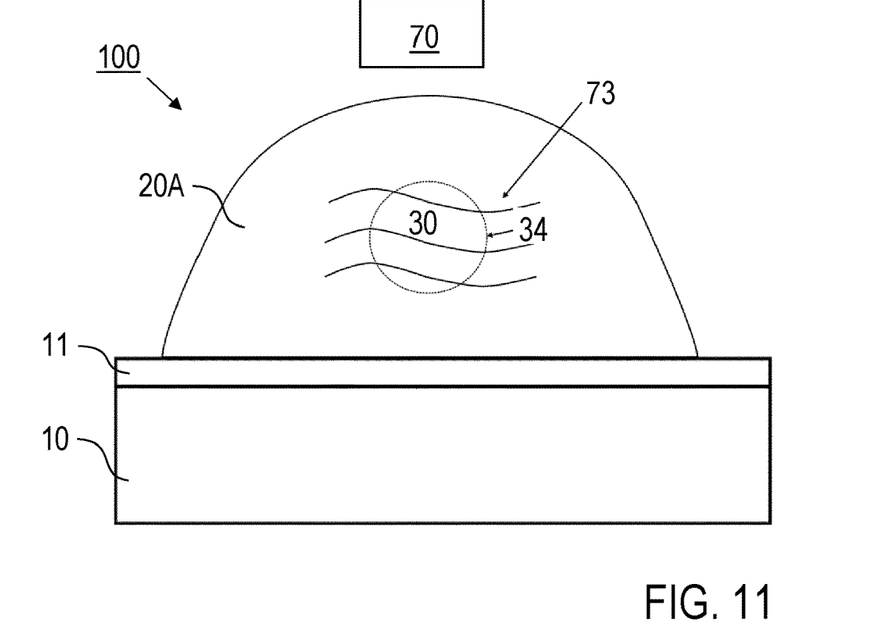
Figure 12:
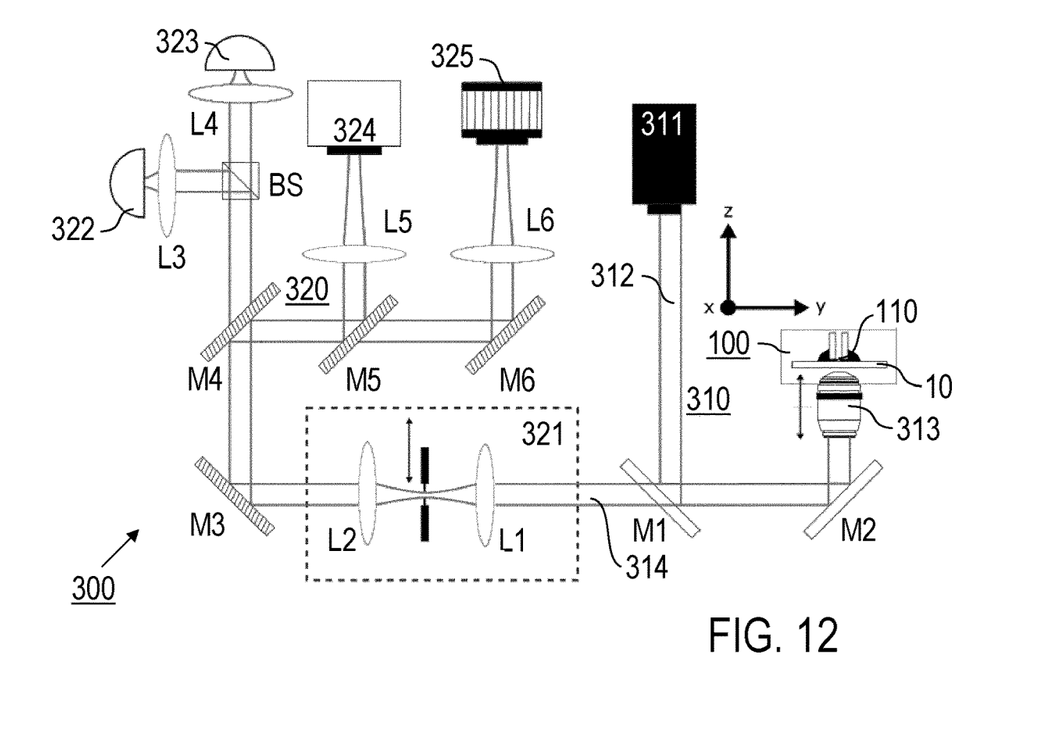
FIG. 12: an overview of an embodiment of a measuring apparatus, including a detailed overview of components forming an excitation light source device and a detector device.
Figure 13:
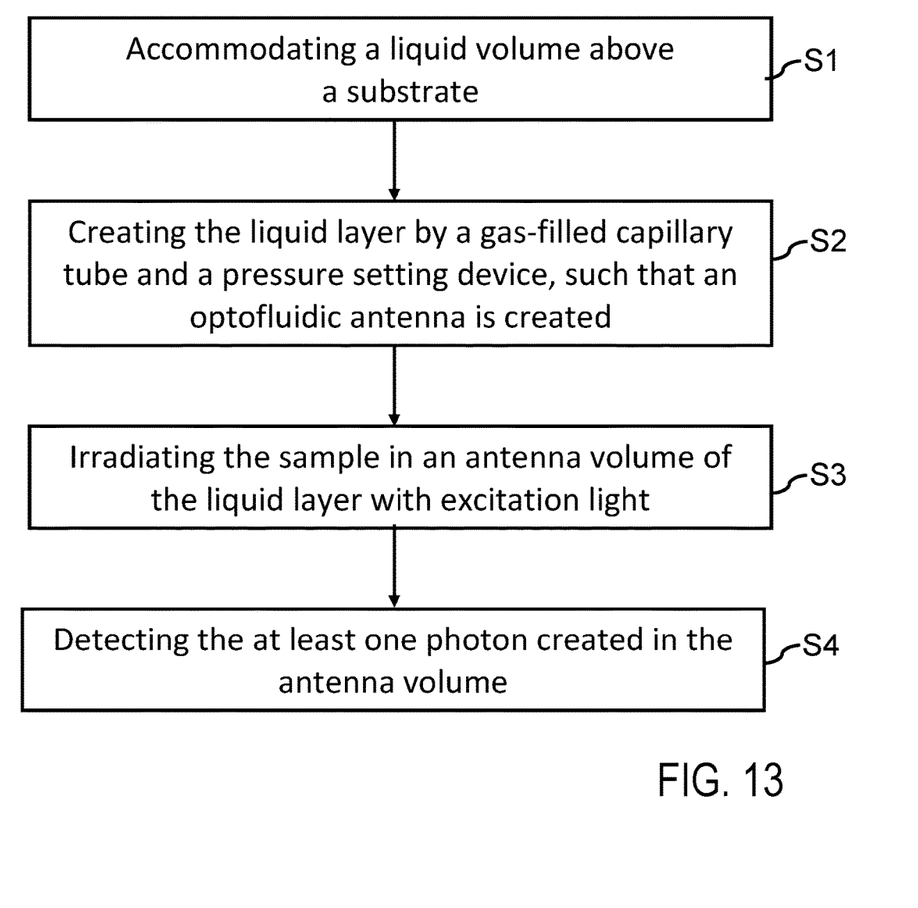
FIG. 13: a flowchart illustrating a detection method according to an embodiment of the invention.
Figure 14:
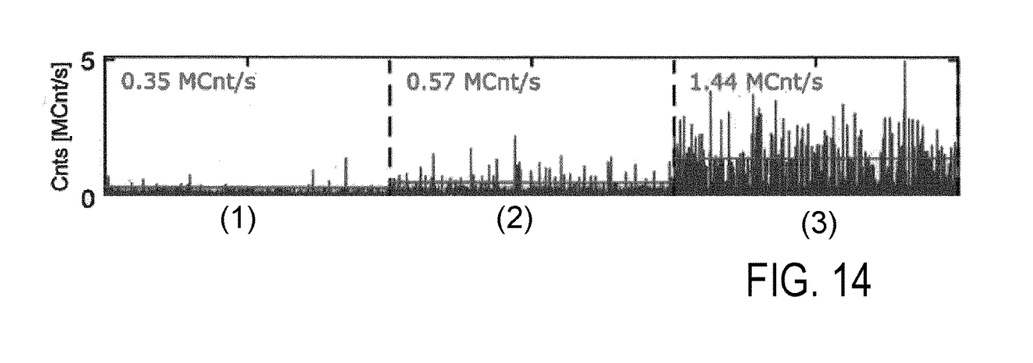
FIG. 14: measurement results, comparing results of analytes measured under three different experimental conditions.

Features of preferred embodiments of the invention are described in the following with reference to the design of the optofluidic antenna device and the measuring apparatus as illustrated in FIGS. 1 to 12, and the method of the invention as illustrated in FIGS. 13 and 14. It is noted that the implementation of the invention is not restricted to the optical and/or fluidic components illustrated in an exemplary manner. In particular, embodiments of the invention can be modified with regard to the number, dimensions and materials of the refractive layers of the optofluidic antenna device, in particular with the features and parameters ranges summarized above. The measures for creating and/or adjusting the gas volume and the liquid layer can be modified and/or combined.

Furthermore, alternative assemblies for the excitation light source device and the detector device known per se in prior art can be employed with the inventive measuring apparatus. The drawings are schematic illustrations, mainly for showing the inventive concept of creating, adjusting and employing the optofluidic antenna device. In practice, the shape and size of the illustrated components can be selected and adapted in dependency on particular application requirements. Details described with reference to one of the illustrated embodiments, e. g. regarding the operation of the optofluidic antenna device, can be employed with other embodiments in a corresponding manner.

Operation conditions of the optofluidic antenna device, like the thickness of the liquid layer, the shape of the liquid-gas-interface and/or the position of a gas-filled compartment, can be selected on the basis of preliminary numerical simulations and/or tests. Furthermore, the operation conditions can be optimized during the measurement, e. g. by monitoring detector signals. Changing the operation conditions can be automated. A control device (not shown) can be provided for controlling the optofluidic antenna device or the measuring apparatus or components thereof, in particular for setting the operation conditions of the optofluidic antenna device.

Figure 1:
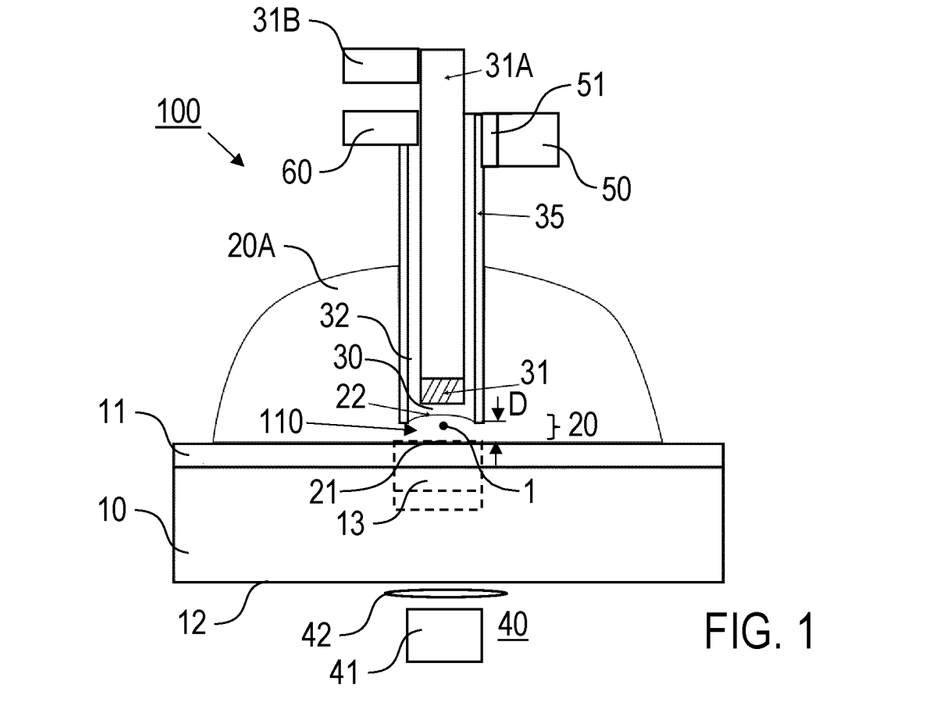

FIG. 1 schematically shows an embodiment of an optofluidic antenna device 100 for shaping a light field of sample light emitted or scattered by a sample 1 to be investigated. The optofluidic antenna device 100 comprises a substrate 10 with a spacer layer 11, a liquid layer 20 being arranged on the spacer layer 11 for accommodating the sample 1, and a gas volume 30 being arranged above the liquid layer 20. The liquid layer 20 is formed as a section of a liquid volume 20A, e. g. a droplet or flow of a water and/or buffer solution that is arranged on the substrate 10. A first liquid surface 21 of the liquid layer 20 is created at the side facing to the spacer layer 11 and the substrate 10, and a second liquid surface 22 is created as a liquid-gas-interface (solution meniscus) at the opposite side facing away from the spacer layer 11 and the substrate 10.

For sensing light emitted or scattered from the sample 1, the optofluidic antenna device 100 is provided with an excitation light source device (not shown in FIG. 1, see FIG. 12) and a detector device 40 (see also FIG. 12). The detector device 40 comprises e. g. a sensor device 41, like a camera or a photodiode, and an optical imaging element 42, like a lens or an objective. With the detector device 40, light from the sample 1 is collected through an exposed surface 12 of the substrate 10. As an alternative to the illustrated embodiment, the sample light can be collected with a waveguide coupled with the substrate 10 in alignment with the optofluidic antenna device 100 and guiding the light to a sensor device.

As an example, the substrate 10 is made of sapphire and/or glass, such as a microscopy cover glass, e. g. with a thickness of 170±5 μm. The optionally provided spacer layer 11 between the substrate 10 and the liquid layer 20 is made of e. g. magnesium fluoride with a thickness of 250 nm. The substrate 10 and the spacer layer 11 form a stack of refractive layers arranged in order of descending or constant refractive indices with the substrate 10 having the highest refractive index.

Optionally, the substrate 10 can comprise a trench 13 (shown with dashed line, see also FIGS. 5 to 8), that is a recess in the substrate 10 with the spacer layer 11 in alignment with the liquid layer 20 and the gas volume 30. In combination with the liquid-gas-interface, the trench 13 enhances the effect of trapping the sample 1. The trench 13 has a depth of about 200 nm to 10 μm.

The gas volume 30 is provided in a gas-filled compartment 32 that is included in a capillary tube 35, like a micro glass or plastics pipette with an inner diameter of e. g. 15 am and an outer diameter of 20 μm. The capillary tube 35 has a first open end facing to the substrate 10 and being submerged into the liquid volume 20A, so that the liquid layer 20 is formed, and a second open end in communication with a surrounding, like the atmosphere or an inert gas, or with a pressure setting device 60, like a pump or syringe (see also FIG. 5). The space below the submerged end of the capillary tube 35 provides the antenna volume 110 of the optofluidic antenna device 100. With a pressure applied by the pressure setting device 60, the shape of the liquid-gas-interface can be influenced. An inner wall surface of the capillary tube 35 may comprise a hydrophobic coating, e. g. made of dichlorodimethylsilane, to improve the formation of the liquid-gas-interface and avoid a suction of the liquid into the capillary tube 35.

The capillary tube 35 is coupled with a compartment setting device 50 including a piezo-electric actuator 51 or another drive, like a motor drive. With the compartment setting device 50, the distance D between the gas-filled compartment 32, e. g. the proximate end of the capillary tube 35 and the first liquid surface 21 can be set, e. g. in a range from 200 nm to 10 μm. The optimum distance D can be obtained e. g. from numerical simulations of the light field shape and/or from tests.

With the compartment setting device 50, the capillary tube 35 may be movable and/or tiltable with various orientations relative to the substrate 10. Preferably, a position and orientation of the capillary tube 35 is selected for the measurement, so that a longitudinal direction of the capillary tube 35 is perpendicular to the substrate 10, an axis of symmetry of the capillary tube 35 is aligned with an axis of symmetry of the optical imaging element 42 of the detector device 40, and/or a lower end of the capillary tube 35 is arranged in focus of the optical imaging element 42 of the detector device 40. However, depending on the application of the invention, an inclined orientation may be provided as well.

A reflector element 31 is arranged in the gas volume 30 with a distance from the liquid-gas-interface, which is selected in a range from 200 nm to 2 μm, e. g. 300 nm. The reflector element 31 is a metallic mirror, in particular a metallic coating, arranged at an end face of a carrier rod 31A, like a glass fibre within the capillary tube 35. The distance between the reflector element 31 and the liquid-gas-interface, e. g. the maximum of the meniscus shape thereof, is set with a reflector setting device 31B. The reflector setting device 31B, that comprises e. g. another piezo-electric actuator, is adapted to position the reflector element 31 such that the radiation pattern of the sample 1 toward the substrate 10 is enhanced. To this end, the optimum distance between the reflector element 31 and the liquid-gas-interface can be obtained e. g. from numerical simulations of the light field shape and/or from tests.

In operation, the liquid volume 20A including the sample 1, e. g. analyte molecules, is placed on the spacer layer 11 and the capillary tube 35 is introduced into the liquid volume 20A, so that the liquid layer 20 is formed. The sample 1 diffuses through the liquid layer 20. By setting the distance D, adjusting the reflector element 31 and applying a pressure with the pressure setting device 60, the optofluidic antenna device 100 is optimized, so that at least one photon emitted or scattered from the sample 1 upon excitation with excitation light is directed through the substrate 10 towards the detector device 40. The radiation field shaping effect of the optofluidic antenna device 100 is created as known from prior art dielectric solid antennas by the effect of increasing refractive indices from the liquid layer 20 toward the substrate 10.

Figure 2:
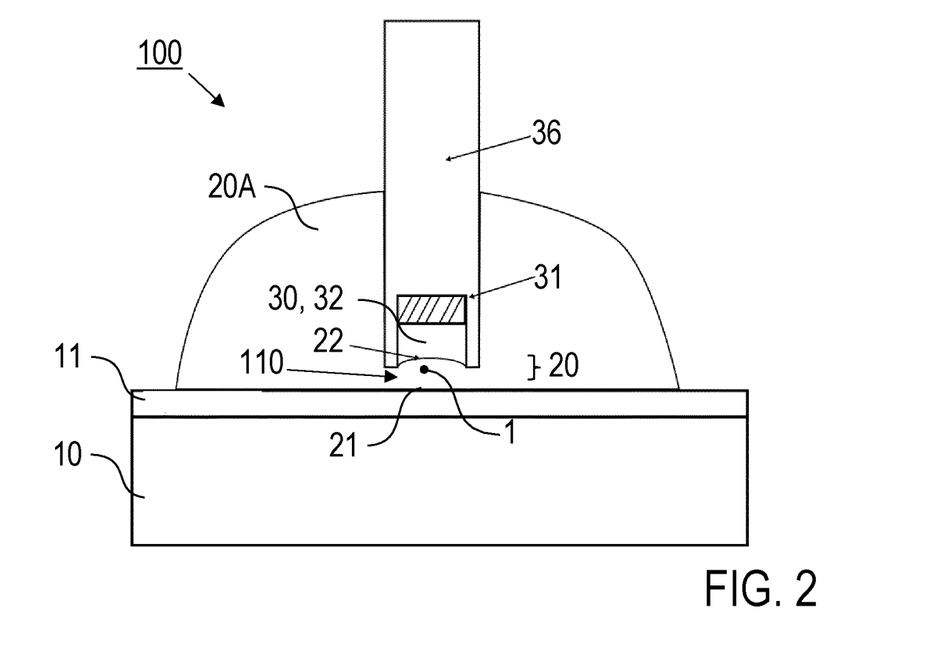

FIG. 2 shows a modified embodiment of the optofluidic antenna device 100 with a configuration similar to the embodiment of FIG. 1. The optofluidic antenna device 100 includes the substrate 10 and the spacer layer 11 carrying the liquid volume 20A as mentioned above. Deviating from FIG. 1, the gas-filled compartment 32 including the gas volume 30 is arranged as a recess at an end of a cantilever or fibre tip 36. The reflector element 31 is positioned and aligned parallel to the substrate 10 at an inner wall of the gas-filled compartment 32. By the gas volume 30 confined in the gas-filled compartment 32, the second liquid surface 22 is created that limits the liquid layer 20. The antenna volume 110 is provided below the gas-filled compartment 32. Light emitted or scattered by a sample 1 diffusing in the antenna volume 110 is mainly directed towards the substrate 10.

Like with the embodiment of FIG. 1, the distance of the cantilever or fibre tip 36 from first liquid surface 21 on the spacer layer 11 can be adjusted with a compartment setting device (not shown). Simultaneously with the setting of the cantilever or fibre tip 36, the position of the reflector element 31 is adjusted.

Figure 3:
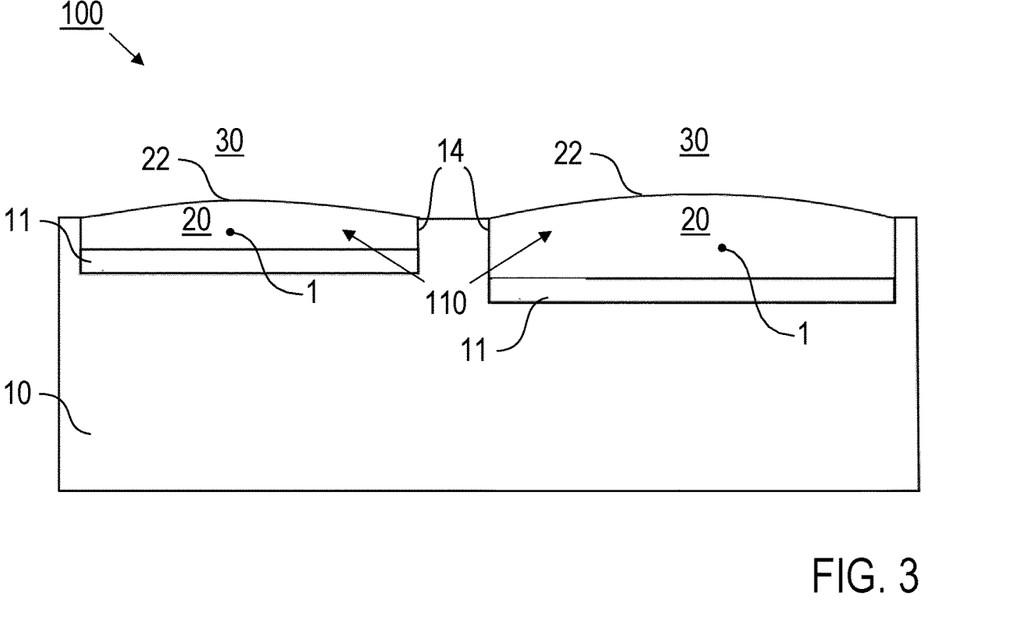
Figure 4:
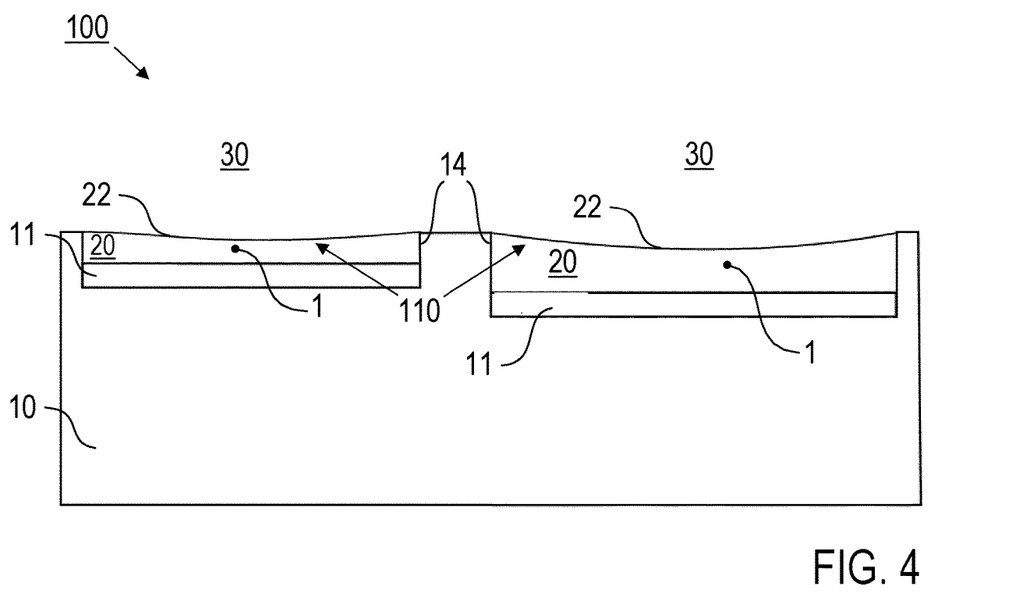

FIGS. 3 and 4 illustrate variants of another embodiment of the inventive optofluidic antenna device 100 with multiple antenna volumes 110, wherein the substrate 10 has multiple recesses 14 accommodating liquid layers 20. The recesses 14 may comprise e. g. channels in the substrate surface. Spacer layers 11 as described above are arranged on the bottom of each recess 14. The gas volume 30 is formed for all liquid layers 20 by a free space above the liquid layers 20. The substrate 10 may comprise e. g. a microscope cover glass or an exposed portion of a fluidic microsystem.

The advantage of the embodiments of FIGS. 3 and 4 is the simple configuration thereof. However, without the provision of adjustable gas-filled compartments, the embodiments of FIGS. 3 and 4 have limited options for controlling the thickness of the liquid layers 20. The depths of the recesses 14 determine the thicknesses of the liquid layers 20, e. g. in a range from 200 nm to 10 μm. The effective liquid layer thickness can be determined not only by the depth of the recesses 14, but also by shaping the meniscus of the second liquid surface 22. This can be obtained by hydrophobic (FIG. 3) or hydrophilic (FIG. 4) coatings on inner surfaces of the recesses 14, resulting in a convex or concave meniscus, resp.

Figure 5:
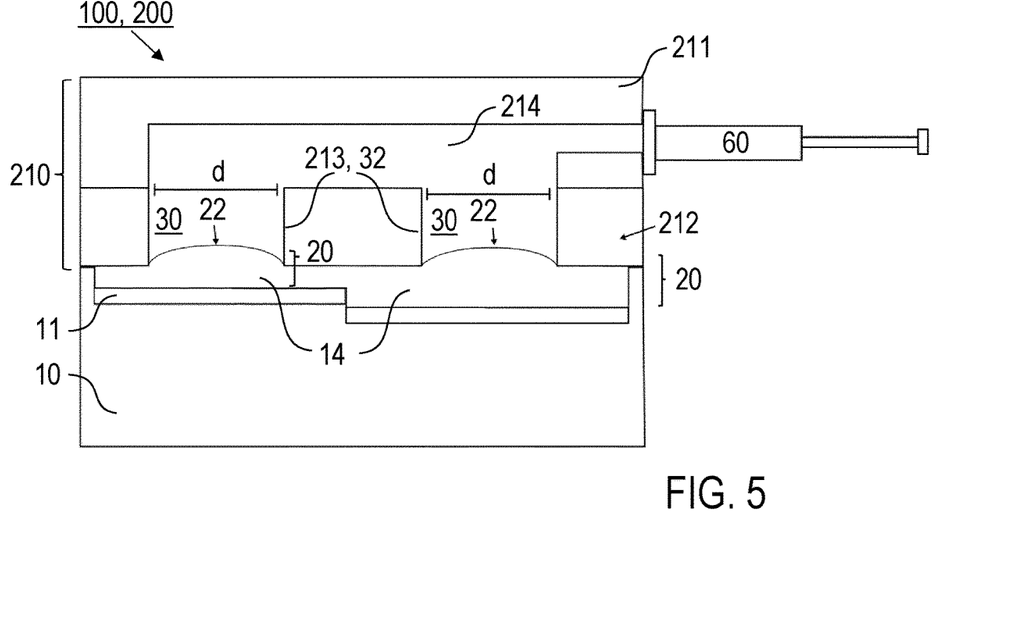
Figure 6:
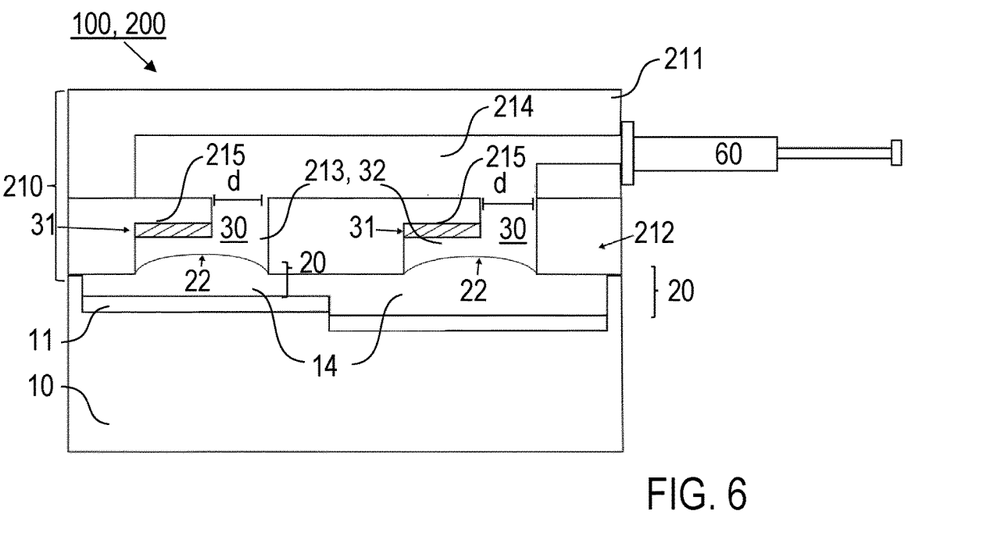

FIGS. 5 and 6 illustrate modifications of the embodiments of FIGS. 3 and 4, wherein the shape of the second liquid surface 22 can be set by adjusting a pressure of the gas volume 30. With these embodiments, the optofluidic antenna device 100 preferably is a portion of a fluidic microsystem 200. FIGS. 5 and 6 show cross-section views of the fluidic microsystem 200, which can be structured with channels, supplies and/or sensors as it is known from conventional micro-fluidics. The liquid-gas-interface formed at the second liquid surface 22 can be provided by the direct contact of the liquid and the gas or, alternatively, by a separating layer made of e. g. graphene (not shown). As the separating layer is flexible, the shape of the second liquid surface 22 can be set even with the presence of the separating layer.

The fluidic microsystem 200 includes the substrate 10 and a multi-layered cover plate 210 being arranged, so that a space is provided therebetween. The substrate 10 is a plate of e. g. sapphire or glass, including recesses 14 and spacer layers 11 on an upper surface thereof. The cover plate 210 comprises a top plate 211 for pressure control and an intermediate plate 212 having recesses (or: holes) 213. The cover plate 210 is made of e. g. glass, plastics, a metal, a semiconductor material, like e.g. Si, or ceramics.

Each recess 213 in the intermediate plate 212 provides a gas-filled compartment 32 accommodating the gas volume 30. The diameter d, that corresponds to the inner capillary diameter in FIG. 1, is selected in a range e. g. from 3 μm to 100 μm. The recesses 213 are aligned with the recesses 14 in the substrate 10, which accommodate the liquid layer 20. Furthermore, the recesses 213 are connected via a channel 214 in the top plate 211 with a pressure setting device 60, like a syringe or a pump.

The liquid layer 20 is accommodated between the substrate 10 and the cover plate 210, in particular in the recesses 14 of the substrate 10. By adjusting the gas pressure in the recesses 213 (gas-filled compartments 32), the shape of the second liquid surface 22 can be influenced. For example, by increasing the pressure, the meniscus can be flattened, while by decreasing the pressure, the meniscus can be enlarged.

As shown in FIG. 6, the recesses 213 in the intermediate plate 212 can be provided with a step-shaped cross-section, so that step planes 215 facing to the substrate 10 are formed. On the step planes 215, reflector elements 31 are arranged for enhancing the light emitted or scattered from the sample 1 to the substrate 10.

Figure 7:
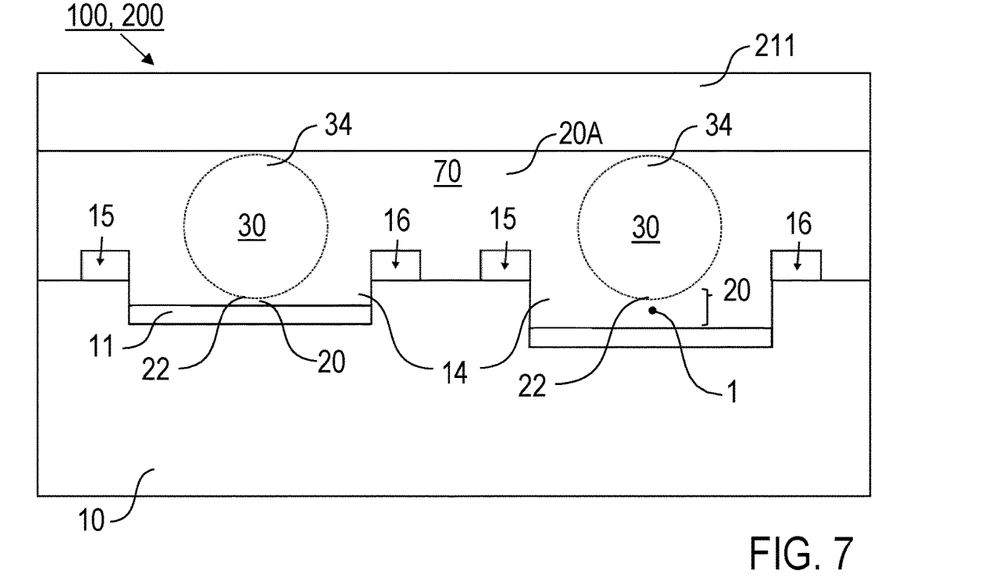

FIG. 7 illustrates an embodiment of the inventive optofluidic antenna device 100 implemented as a chip-microfluidic-electrolysis-based dielectric antenna. As described with reference to FIG. 5, the optofluidic antenna device 100, including the substrate 10 with the spacer layers 11 and the recesses 14 and further including the top plate 211, is a portion of a fluidic microsystem 200. The space between the top plate 211 and the substrate 10 is filled with a liquid volume 20A including the sample 1. Furthermore, the space contains electrodes 15, 16 being arranged adjacent to the recesses 14, e. g. on the surface of the substrate 10 facing to the top plate 211. The electrodes 15, 16 comprise pairs of anodes and cathodes that are connected with a voltage source (not shown). By applying a dc operation voltage to the electrodes 15, 16, gas bubbles 34 are created by electrolysis. The gas bubbles 34 are trapped in the spacing between the top plate 211 and the substrate 10, which provide a gas bubble holding device 70 for holding the gas bubbles 34 in the liquid volume 20A. The gas bubbles 34 provide gas volumes 30, that define the second liquid surface 22 with the liquid-gas-interface and the liquid layer 20. The thickness of the liquid layer can be defined by the depth of the recesses 14 and the size of the bubbles 34 obtained by the electrolysis. By specific control of the operation voltage and/or duration of applying the operation voltage of each of the pairs of electrodes 15, 16, specific different thicknesses of the liquid layers 20 can be adjusted in the recesses 14.

Figure 8:
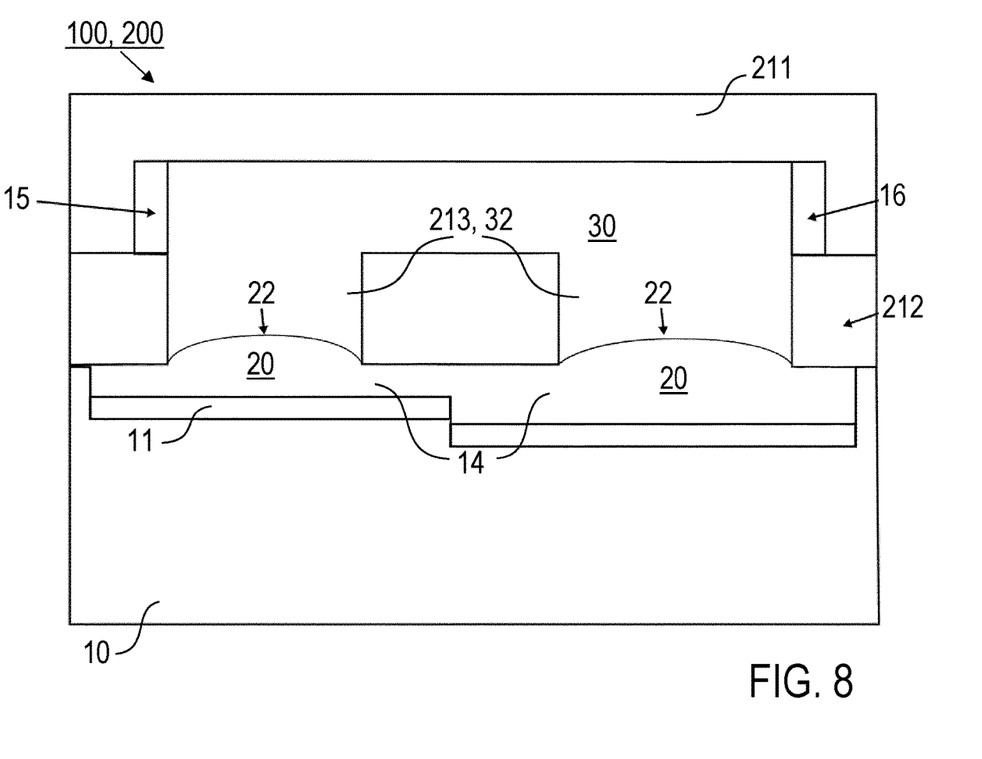

An alternative embodiment of the inventive optofluidic antenna device 100 with electrolysis-based gas creation in a fluidic microsystem 200 is illustrated in FIG. 8. Again, the optofluidic antenna device 100 includes the substrate 10 with the spacer layers 11 and the recesses 14. The substrate 10 is covered with the top plate 211 and the intermediate plate 212 having recesses 213 that provide gas-filled compartments 32. The space between the top plate 211 and the substrate 10 and the recesses 213 of the intermediate plate 212 is filled with a gas volume, while the liquid layer 20 including the sample 1 is arranged on the substrate 10. Similar to FIG. 7, the spacing contains electrodes 15, 16, including an anode and a cathode that are connected with a voltage source (not shown). However, there is only one pair of electrodes 15, 16 for creating the gas volume 30 in the whole space within the fluidic microsystem 200.

With the embodiment of FIG. 8, the gas volume 30 is created above the whole liquid volume on the substrate 10, so that all second liquid surfaces 22 above different sections of the liquid layer 20 are adjusted simultaneously. The amount of gas created by electrolysis is selected such that the recesses 213 are completely filled with gas.

Figure 9:
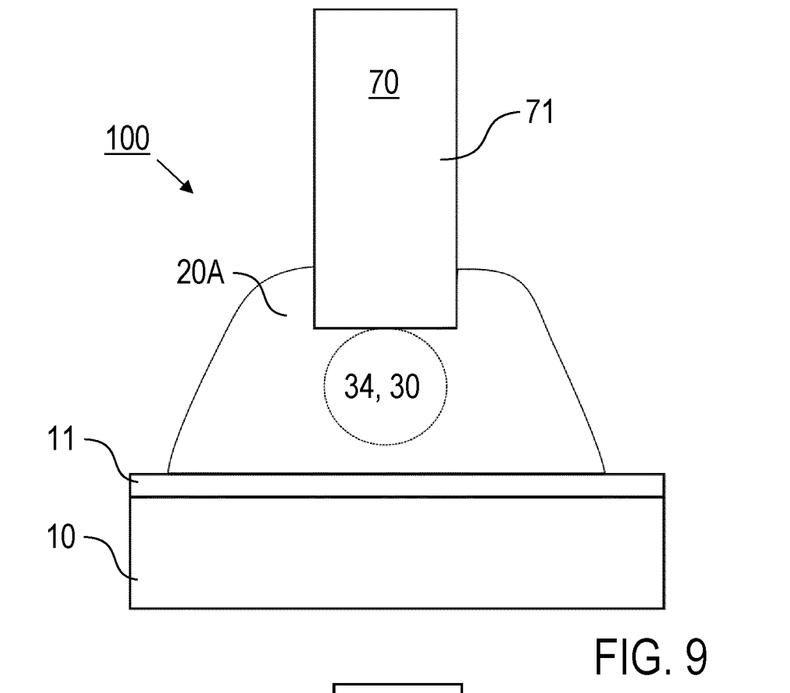
Figure 10:
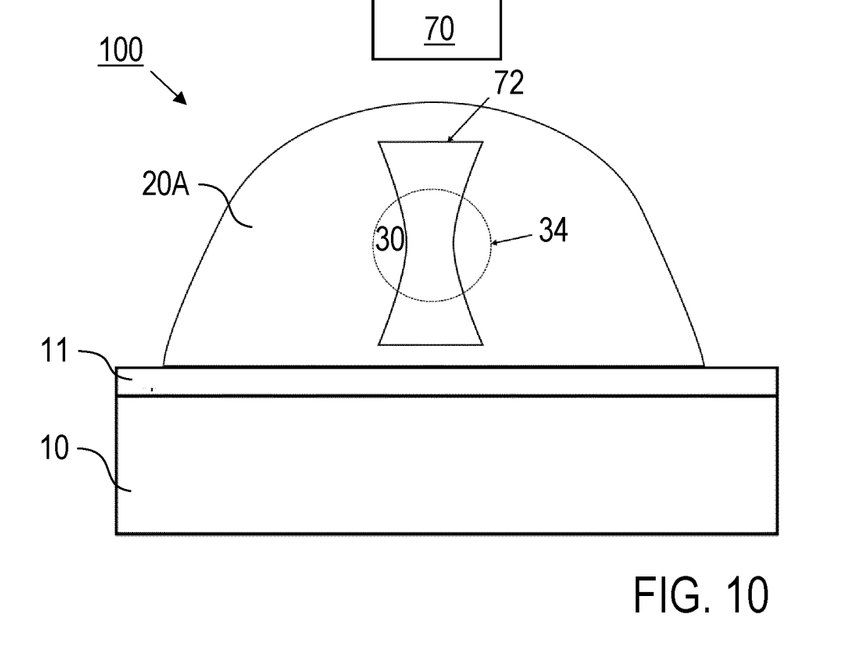

Further embodiments of the inventive optofluidic antenna device 100 are shown in FIGS. 9 to 11, wherein the gas volume 30 is formed by a gas bubble 34 in a liquid volume 20A above the substrate 10 with the spacer layer 11. In these cases, further variants of a gas bubble holding device 70 are employed for positioning the droplet and setting the liquid layer 20 in the liquid volume 20A. According to FIG. 9, the gas bubble holding device 70 comprises a mechanical support rod 71, that is structured and can be manipulated as described above with reference to FIGS. 1 and 2. According to the alternative of FIG. 10, the gas bubble holding device 70 comprises a laser source being arranged for creating an optical tweezer 72 in the liquid volume 20A. Furthermore, according to the alternative of FIG. 11, the gas bubble holding device 70 comprises an ultra-sound source being arranged for creating an acoustic tweezer 73. The different types of gas bubble holding devices 70 can be combined, e. g. by superimposing optical and acoustic tweezers or stabilizing the gas bubble at the end of the rod 71 with at least one of the tweezers.

FIG. 12 illustrates features of an embodiment of the inventive measuring apparatus 300 with an exemplary setup of a confocal microscope comprising an excitation light source device 310, an optofluidic antenna device 100 and a detector device 320. The optofluidic antenna device 100 includes the sample to be investigated. The excitation light source device 310 is arranged for irradiating the sample 1 with excitation light and creating the at least one photon. The detector device 320 is arranged for detecting the at least one photon created in the optofluidic antenna device 100.

It is emphasized that the invention is not restricted to the implementation with a confocal microscope, but correspondingly possible with other measuring set-ups for investigating a sample in a liquid by irradiating the sample with excitation light and collecting sample light emitted by the sample. For example, the optofluidic antenna device 100 can be integrated in a flow cytometer, wherein the antenna volume is provided in a channel of the flow cytometer and the excitation light source and detector devices 310, 320 are arranged on at least one side of the channel. Furthermore, the invention is not restricted to the illustrated excitation and/or detector configurations but rather can be implemented with other excitation geometries and/or available detectors. For example, in FIG. 12, the excitation light source device 310 is configured such that excitation light is directed to the optofluidic antenna device 100 from the substrate side. Alternatively, the excitation light source device 310 can be arranged with another configuration suitable to emit excitation light towards the antenna volume 110, e. g. from above. With a further alternative, excitation and/or detection can be obtained via a solid immersion lens.

The excitation light source device 310 comprises e. g. at least one continuous wave laser 311 with a centre wavelength of e. g. 532 nm. Alternatively or additionally other light sources such as at least one pulsed laser and/or other wavelengths may be chosen. An excitation light beam 312 of the continuous wave laser 311 is deflected via mirrors M1, M2 to a rear aperture of a microscope optic 313, e. g. a 100×/1.46 NA oil immersion objective. Mirror M1 is a dichroic mirror used to separate the excitation light beam 312 from the sample light beam 314 emitted or scattered by the sample, i.e. the light obtained from the sample passes the mirror M1 without deflection toward the detector device 320. With the microscope optic 313, the excitation light beam 312 is focused through the substrate 10 into the antenna volume 110 of the optofluidic antenna device 100.

Sample light that is emitted or scattered by the sample in the focus of the excitation light beam 312 is collected by the same microscope optic 313 and is relayed as the sample light beam 314 via the mirrors M2, M1 to the detector device 320. Hence, in this setup, the microscope optic 313 and the mirrors M1, M2 can be considered as parts of both of the excitation light source device 310 and the detector device 320.

After passing the mirror M1, the sample light beam 314 is focused with a first lens L1 of a tele-scope optic 321 onto a small pinhole P in order to improve both the lateral and axial resolution of confocal imaging as well as the signal-to-noise ratio of the setup. For example, the pinhole has a diameter of 75 μm.

Subsequently, the light is re-collimated with a second lens L2 and relayed via mirror M3 into a Hanbury-Brown and Twiss detector configuration where the sample light is split by a 50/50 beam splitter BS and focused with third lens L3 onto a first single photon avalanche diode (SPAD) 322 and with a fourth lens L4 onto a second SPAD 323. The SPADs 322, 323 are configured to detect incoming photons, wherein the two-SPAD-configuration has advantages for detection of dead time, thus increasing the detection efficiency. A photon-counting module can be employed to read the output signals from SPADs 322, 323. Mirrors M5, M6 and further lenses L5, L6 can be provided for additionally imaging the antenna volume 110 with a camera 324, such as a charge-coupled device (CCD) camera, and/or record a spectrum with a spectrometer 325.

Features of embodiments of a method for detecting at least one photon emitted or scattered from a sample is illustrated in FIGS. 13 and 14. Exemplary reference is made to employing an optofluidic antenna device 100 as shown in FIG. 1.

With a preparation step (not shown in FIG. 13), the substrate 10 and the further components of the optofluidic antenna device 100 can be prepared by a user as described in the following. Alternatively, pre-fabricated components can be used. As a first step of the preparation, the substrate 10, e. g. a microscopy cover glass, is cleaned, e. g. employing an ultrasonic bath and/or oxygen plasma. Then, the spacer layer 11 is deposited on top of the substrate 10. As an example, magnesium fluoride ($MgF_2$) is deposited with a thermal evaporator in a vacuum. Alternatively, the spacer layer 11 is made of the fluoropolymer "CYTOP" by a spin coating process. The capillary tube 35 (see FIG. 1) is manufactured e. g. by pulling a thin-wall capillary using a micropipette puller. After the pulling procedure, the capillary tube 35 is cleaved for achieving a flat ending. Instead of manufacturing the capillary tube 35, commercially available tubes, such as micropipettes, with similar properties may be chosen.

Subsequently, the capillary tube 35 is dipped in a hydrophobic solution, e. g. dichlorodimethylsilane (DCDMS), to make the inner wall of the capillary tube 35 hydrophobic in order to avoid water inside the capillary tube 35 due to capillary forces. Larger DCDMS residuals inside the capillary tube 35 at the end thereof are removed afterwards by dipping the capillary tube 35 firstly in acetone and subsequently in 2-propanol under an ultrasonic bath. As a result, a thin layer of DCDMS is formed. A further step of cleaning with isopropyl alcohol (IPA) in an ultrasonic bath is done to remove residual acetone. The remaining IPA is removed by heating the capillary tube 35 for e. g. 1 minute at 250° C. The completed capillary tube 35 is connected to the compartment setting device 50, and the pressure setting device 60 is connected with the upper end of the capillary tube 35.

According to FIG. 13, with step S1, the liquid volume 20A is accommodated above the substrate 10, thus forming the first liquid surface 21 (see FIG. 1). In particular, the liquid volume 20A is arranged on top of the spacer layer 11. The sample 1 may be included in the liquid volume 20A before applying the liquid volume 20A on the substrate 10. Alternatively, the sample can be added after the application of the liquid volume 20A, e. g. using a droplet deposition technique.

The liquid volume 20A may comprise e. g. a 1 pM concentration solution of R6G-99%-pure in milli-Q water, which is prepared in a process of several steps of dilution and no further filtering of the solution.

With step S2, the capillary tube 35 is moved with the compartment setting device 50 towards the liquid volume 20A, until the lower tube end is submerged in the liquid volume 20A and the liquid layer 20 with the second liquid surface 22 (liquid-gas-interface) is formed below and within the capillary tube 35. Accordingly, the capillary tube 35 is set relative to the substrate 10.

Then, the distance of the second liquid surface 22 from the first liquid surface 21 is set by applying an adjustment pressure to the gas within the capillary tube 35 with the pressure setting device 60. The gas pressure within the capillary tube 35 can be increased or decreased via the pressure setting device 60. As an example, the pressure setting device 60 comprises a syringe. By moving the plunger of the syringe, the gas pressure may be increased so that a pressure force pushes the second liquid surface 22 (liquid-gas-interface) towards the first liquid surface 21.

By arranging the capillary tube 35 and by applying the adjustment pressure with the pressure setting device 24, the liquid layer 20 is shaped such that the optofluidic antenna is created and the sample 1 is trapped in the antenna volume 110, which is confined by walls of the capillary tube 35 at the lower tube end, the second liquid surface 22 and the first liquid surface 21. Trapping the sample 10 in the antenna volume 110 can be monitored e. g. by detecting photon emissions from the sample or imaging the antenna volume.

After the capillary tube 35 and the second liquid surface 22/liquid-gas-interface have been adjusted, the mutual arrangement of the optofluidic antenna device 100, the excitation light source device 310 and the detector device 320 (see FIG. 12) can be kept fixed during the subsequent steps S3 and S4.

With step S3, the sample 1 is irradiated in the antenna volume 110 with excitation light from the excitation light source device 310 to create photons. As mentioned before, different illumination excitation schemes may be applied so that an excitation photon emitted by the excitation light source device 310 either is scattered by the sample 1 or excites the sample 1 to emit e. g. a fluorescence photon.

Simultaneously to step S3, the emitted or scattered photons are detected in the antenna volume 110 with the detector device 320 (step S4). Steps S3 and S4 may be performed for any period of time, in particular for long term observation studies. The focus of the microscope optic 313 is not moved during the detection step.

The setup of the measuring apparatus 300 may be calibrated to optimize the photon detection efficiencies. For example, steps S2 to S4 may be repeated for different arrangements of the capillary tube 35 and the liquid-gas-interface, e. g. for different thicknesses of the liquid layer 20/distances of the liquid-gas-interface from the first liquid surface 21, to find a setup of the measuring apparatus 300 with highest photon count in a predetermined calibration time period.

FIG. 14 illustrates measurement results, comparing time traces (1 ms binning) of fluorescence burst signals of analytes measured under three different experimental conditions and recorded using a confocal illumination. The horizontal lines indicate the average fluorescence burst count recorded in each structure. In condition (1), no substrate layer is arranged between the fluid sample layer and the microscope optic. In condition (2), the substrate layer is arranged between the fluid sample layer and the microscope optic. Lastly, condition (3) corresponds to the invention. The analyte species, analyte concentration and macroscopic setup were identical for all measurements. According to the results, the invention (condition (3)) provides a 2.5-fold enhancement of the number of detected photons and thus the photon detection efficiency over the measurement setup of (2).

The features of the invention disclosed in the above description, the drawings and the claims can be of significance individually, in combination or sub-combination for the implementation of the invention in its different embodiments.

The invention claimed is:

1. An optofluidic antenna device, being configured for shaping a light field of sample light emitted or scattered by a sample to be investigated, comprising:
   a substrate, and
   a liquid layer being supported by the substrate and being arranged for accommodating the sample to be investigated between a first liquid surface facing the substrate and a second liquid surface opposite to the first liquid surface, wherein
   a thickness of the liquid layer between the first and second liquid surfaces and refractive indices of the substrate and the liquid layer are selected such that an optofluidic antenna is formed, which is capable of directing the sample light mainly towards the substrate, and
   a gas volume is arranged above the liquid layer, so that the second liquid surface is formed as a liquid-gas-interface.

2. The optofluidic antenna device according to claim 1, further comprising
   a spacer layer being arranged on the substrate for accommodating the liquid layer, wherein the substrate and the spacer layer form a stack of refractive layers arranged in order of descending or constant refractive indices with the substrate having a highest refractive index.

3. The optofluidic antenna device according to claim 2, wherein
   the spacer layer and the liquid layer have the same refractive index which is smaller than the refractive index of the substrate.

4. The optofluidic antenna device according to claim 2, wherein
the spacer layer and the substrate have the same refractive index which is higher than the refractive index of the liquid layer.

5. The optofluidic antenna device according to claim 2, including at least one of the features
the substrate has a refractive index of at least 1.35, and
the spacer layer includes at least one of magnesium fluoride, silicon dioxide and a fluoropolymer.

6. The optofluidic antenna device according to claim 1, wherein
the substrate has an exposed substrate surface being arranged opposite to the liquid layer, wherein the sample light is detectable through the exposed substrate surface by a detector device.

7. The optofluidic antenna device according to claim 1, wherein
a reflector element is arranged in the gas volume with a distance from the liquid-gas-interface for further enhancing radiation to the substrate.

8. The optofluidic antenna device according to claim 1, further comprising
a gas-filled compartment having an open side facing the substrate and being submerged into the liquid layer, wherein
the gas-filled compartment is arranged with a distance from the first liquid surface, and
the liquid-gas-interface is formed in the gas-filled compartment.

9. The optofluidic antenna device according to claim 8, wherein
the substrate includes at least one of trenches and pockets, being aligned with the gas-filled compartment.

10. The optofluidic antenna device according to claim 8, wherein
an inner compartment surface of the gas-filled compartment comprises a hydrophobic coating.

11. The optofluidic antenna device according to claim 8, further comprising
a compartment setting device, being configured for setting a distance between the gas-filled compartment and the substrate.

12. The optofluidic antenna device according to claim 8, wherein
the gas-filled compartment encloses a gas bubble providing the gas volume.

13. The optofluidic antenna device according to claim 8, wherein
the gas-filled compartment is connected with a pressure setting device being arranged for setting a gas pressure in the gas-filled compartment, and
the thickness of the liquid layer can be adjusted by operating the pressure setting device.

14. The optofluidic antenna device according to claim 13, wherein
the pressure setting device comprises at least one of a syringe, a pump, a gas reservoir with adjustable pressure, a compartment temperature control device and an electrolytic gas source.

15. The optofluidic antenna device according to claim 8, wherein
the gas-filled compartment is provided by a tube or a cantilever tip.

16. The optofluidic antenna device according to claim 8, wherein
the optofluidic antenna device is a portion of a fluidic microsystem including the substrate and a cover plate providing a space therebetween,
the liquid layer is accommodated between the substrate and the cover plate, and
the gas-filled compartment is formed as a recess in at least one of the substrate and the cover plate.

17. The optofluidic antenna device according to claim 16, wherein
the recess is provided in the cover plate with a step-shaped cross-section, including a step plane facing the substrate, and
a reflector element is arranged on the step plane.

18. The optofluidic antenna device according to claim 1, wherein
the gas volume is formed by a gas bubble being positioned with a gas bubble holding device in a liquid volume including the liquid layer.

19. The optofluidic antenna device according to claim 18, wherein
the gas bubble holding device comprises at least one of a mechanical support rod, an optical tweezer and an acoustic tweezer.

20. The optofluidic antenna device according to claim 1, wherein
the substrate has a recess accommodating the liquid layer, wherein a depth of the recess determines the thickness of the liquid layer, and
the gas volume is formed by a free space above the liquid layer.

21. The optofluidic antenna device according to claim 1, wherein
multiple gas volumes are arranged above the liquid layer, and
multiple optofluidic antennas are formed by the gas volumes, the liquid layer and the substrate.

22. A measuring apparatus, being configured for detecting at least one photon emitted or scattered by a sample, comprising:
an optofluidic antenna device according to claim 1,
an excitation light source device being arranged for irradiating the sample in the liquid layer with excitation light and creating the at least one photon, and
a detector device being arranged for detecting the at least one photon created in the liquid layer.

23. The measuring apparatus according to claim 22, wherein
the excitation light source device is adapted for one of a confocal, wide-field, total internal reflection and structured illumination excitation for irradiating the sample in the liquid layer.

24. A method of detecting at least one photon emitted or scattered from a sample, in, wherein an optofluidic antenna device according to claim 1 is used, comprising the steps of:
accommodating the liquid layer including the sample above the substrate of the optofluidic antenna device,
irradiating the sample in the liquid layer with excitation light from an excitation light source device and creating the at least one photon, and
detecting the at least one photon created in the liquid layer with a detector device.

25. The method according to claim 24, wherein
directing the at least one photon through the substrate towards the detector device is enhanced by a spacer layer between the substrate and the liquid layer, wherein the substrate and the spacer layer form a stack of refractive layers arranged in order of descending or constant refractive indices with the substrate having the highest refractive index.

26. The method according to claim 24, wherein the radiation through the substrate is further enhanced with a reflector element being arranged in the gas volume with a distance from the liquid-gas-interface.

27. The method according to claim 24, wherein a confocal, a wide-field, a total internal reflection or a structured illumination excitation is provided by irradiating the sample in the liquid layer.

28. The method according to claim 24, wherein the liquid layer comprises at least one of water, a buffer solution and a cultivation liquid.

29. The method according to claim 24, wherein the sample is a single analyte in a liquid.

30. The optofluidic antenna device according to claim 15, wherein the tube providing the gas-filled compartment is a capillary tube.

* * * * *